June 26, 1934. M. HANSEN 1,964,152
EGG FEEDING MACHINE
Filed Dec. 18, 1931
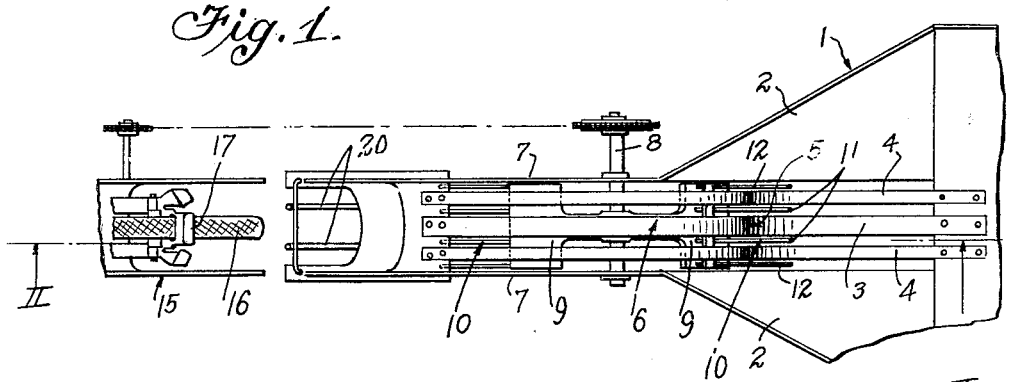
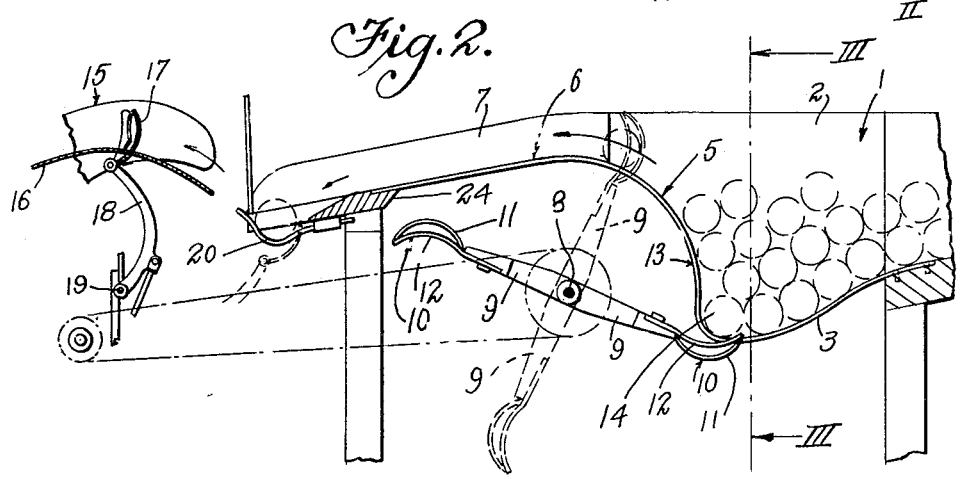
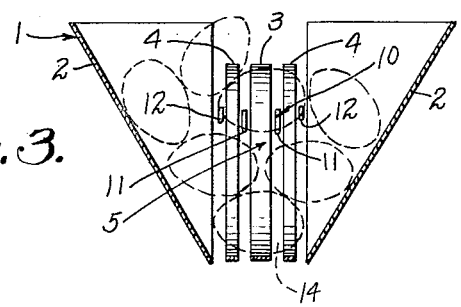
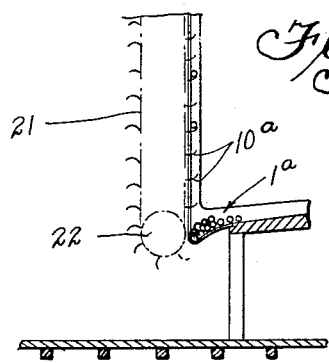
Inventor
Morten Hansen
By Lyon & Lyon
Attorneys Patented June 26, 1934

1,964,152

UNITED STATES PATENT OFFICE 1,964,152

EGG FEEDING MACHINE

Morten Hansen, Los Angeles, Calif., assignor of one-half to William G. Young, Los Angeles, Calif.

Application December 18, 1931, Serial No. 581,884

4 Claims. (Cl. 198—20)

This invention relates to egg handling machinery and has as a broad object the removal of eggs, one at a time, from a bulk supply, whereby they may be fed singly and at a desired rate to a treating, testing, weighing or grading machine.

Various machines are in use for more or less automatically treating objects such as fruits, vegetables, etc., and it is common practice to convey the objects to be treated to or through the necessary machinery one at a time, either by moving belts, inclined troughs or other conveying means. The first step in such a treating process is to separate or detach the individual objects from a bulk supply and deliver them one at a time to the conveyor.

It is relatively easy to separate non-fragile fruits and vegetables from a bulk supply, particularly when the articles are nearly round so that they roll freely in any direction. For this reason there are now in use satisfactory machines for feeding oranges, apples, and similar objects. I have found, however, that existing machines known to me will not function properly with eggs because of their fragile nature and peculiar shape. I have found that if prior known machines are used with eggs they fail either by feeding two eggs simultaneously, by failing to feed at all on occasions, or by crushing the eggs.

In accordance with the present invention I separate eggs one at a time from a bulk supply by passing cups just large enough to support one egg up through a container having therein a bulk supply of eggs several layers deep. I have found this method to be substantially 100% efficient since the cup cannot hold, and therefore cannot deliver, more than one egg at a time, and the fact that the cup passes through several layers of eggs practically eliminates the possibility of its ever failing to pick up an egg.

The invention will now be explained in detail with reference to the accompanying drawing, in which Figure 1 is a plan view of my device;

Figure 2 is a vertical elevational view of the device partly in section taken in the plane 2—2 of Figure 1;

Figure 3 is an elevational sectional view in the plane 3—3 of Figure 2; and

Figure 4 is an elevational sectional view of a modified form of the invention.

Referring to Figures 1 and 2, my device comprises a receptacle for a bulk supply of eggs designated generally at 1, and comprising as portions of its containing walls two sloping walls 2. The bottom of the receptacle and the left end thereof is formed of four strips comprising a center strip 3, and two outer strips 4 positioned on either side of the center strip. Strips 3 and 4 are shaped, as shown in Figure 2, to form a pocket about midway between the side walls 2, beyond which they rise almost vertically for a distance and then bend outwardly in a curve as shown at 5. Beyond the uppermost part 6, the strips are again inclined downwardly so that an egg when carried beyond the point 6, as will be described later, will roll therebeyond by gravity.

The portion of receptacle 1 to the right of the walls 2 may be of any desired shape and size but is preferably provided with a sloping floor so that eggs placed therein will tend to crowd down into the pocket formed between the sloping walls 2. It is to be noted that side walls 7 are provided along the outer edges of strips 4 beyond the sloping walls 2 to prevent an egg from rolling off these strips.

The walls 2 and 7 may be of either wood, or sheet metal, and the portion of the receptacle to the right of walls 2 may be of similar construction. The strips 3 and 4 are of metal and are secured at their ends to the floor of the receptacle and a supporting block 24, respectively.

As shown in Figure 1 the inner edges of the walls 2, and the walls 7, together with the floor strips 3 and 4 define therebetween four slots which extend from the lowermost portion of receptacle 1 out along the runway defined by the strips 3 and 4.

Mounted to the left and below the receptacle 1 is a shaft 8 upon which are mounted, by suitable radially projecting arms 9, a plurality of cups or cradles 10, each of which comprises four fingers 11 and 12. These fingers are spaced apart laterally to pass through the slots defined by the strips 3 and 4. The two central fingers 11 are curved to extend below the outer fingers 12 and all of them extend sufficiently past the strips 3 and 4 to define with the strips a cradle or pocket just large enough to contain one egg.

The shaft 8 is rotated by any suitable source of power in a counterclockwise direction to revolve the cups 10 up through receptacle 1, and the device operates as follows: Assume that the receptacle 1 is filled with a bulk supply of eggs in sufficient quantity so that they crowd down between the sloping walls 2 and fill the space therebetween to a depth equalling or exceeding that of several layers of eggs. As shaft 8 rotates the arms 9 carry the fingers 11 and 12 through the bottom of the receptacle between the slots defined by the strips 3 and 4, and thereafter up along the curved surfaces of the strips. During their passage through the receptacle the fingers 11 and 12 encounter the eggs and sooner or later pass substantially directly under an egg, thereafter carrying it up and displacing the eggs thereabove to the right and to the left as it does so. The egg after being lifted clear of the main mass of eggs by the cup 10 is rolled up along the curved surface 5 of the strip 3 and over the uppermost portion 6, after which it rolls away from the cup 10 by gravity.

Referring to Figure 3, in which a possible arrangement of the eggs in the receptacle 1 adjacent the end wall 13 is shown, it will be seen that one egg designated at 14 is substantially centered in the bottom of the receptacle. Therefore, when the next cup 10 passes upward, it will probably lift egg 14 and as this happens the eggs thereabove will roll down to take the place of the egg removed. It may happen that another egg will roll into the central position formerly occupied by egg 14, in which case the next cup will life, this egg and carry it out. However, there is a possibility that two eggs will crowd down to fill the place formerly occupied by the central egg 14 so that the next cup as it moves upward will engage the ends of two eggs instead of picking up one egg as is desired. It is quite obvious that if there were only a single layer of eggs in the bottom of receptacle 1, the cup 10 might pass upward without carrying an egg. However, if the receptacle is filled with a mass of eggs several layers deep, the chances are very remote that there will not be at least one egg in the path of the cup during its passage upward through the receptacle, and any such egg is of necessity carried out of the repectacle by the cup.

In Figure 2, I have shown my device used to deliver eggs one at a time at predetermined intervals to a machine, designated generally at 15, that forms a part of an egg breaking machine disclosed and claimed in copending application Serial No. 449,240, filed May 2, 1930, in the names of William G. Young, Morton Hansen, and Joseph F. Pollon. This machine comprises a track or runway 16 and a pusher 17 mounted on the end of an arm 18 adapted to oscillate about a pivot point 19. The machine described in the aforementioned application operates to break eggs individually at a fixed rate of speed and it is important that the eggs be delivered one at a time to the machine at this rate. The arm 18 is therefore so coupled to the driving mechanism of the rest of the machine that it oscillates about the point 19 from the position shown in full lines to the position shown in dotted lines and back again, in the time required by the machine to break and dispose of one egg. It will be seen that eggs after being carried up the curved surface 5 and over the highest point 6 by the cups 10 will roll down the runway to the left of point 6 and will be deposited in a pocket formed by rods 20.

The pusher 17 is flexibly mounted on the end of arm 18 so that as the arm 18 moves in a clockwise direction and the back of the pusher 17 encounters an egg on the rods 20, member 17 folds to the left, thus passing back of the egg. Thereafter, it is returned to the position shown in the drawing, and on the subsequent counterclockwise movement of the arm 18 the pusher 17 lifts the egg from the rods 20 and carries it up over the track 16, thus delivering it to the egg breaking mechanism (not shown). By driving the shaft 8 on which the arms 9 are mounted at the proper rate of speed from a shaft on the egg breaking machine to the left thereof, the cups 10 can be moved at such a speed as to supply eggs to the pusher 17 in step therewith.

Although in Figures 1, 2, and 3, the cups 10 are shown mounted on the ends of radial arms 9, it is not essential that they be so mounted, nor is it essential that the cups move in a circular path. Thus, as shown in Figure 4, the cups 10a may be mounted on an endless belt 21 passing over pulleys 22 and 23 respectively. The construction of the receptacle 1a in this case is similar to that in Figures 1, 2, and 3, except that the end wall containing the strips 3 and 4, instead of being curved as shown at 5 in Figure 2, is vertical. The cups as they pass upward through the receptacle 1a pick eggs therefrom in exactly the same manner as described above in connection with the first three eggs. The construction shown in Figure 4 may be advantageous in some instances where it is desirable to mount the receptacle 1a upon the lower floor of a building, and to mount the egg treating or processing machine upon an upper floor of the same building.

Although I have shown my feeding mechanism used in connection with the egg breaking machine disclosed in application, Serial No. 449,240, it is to be understood of course that it is not limited to use with this machine and that the eggs after being delivered over the point 6 may be fed onto a conveyor belt or into any desired machine.

I have found that it is difficult to roll an egg in a straight path unless it is supported at its point of largest circular diameter. For this reason, I provide an even number of fingers 11 and 12 on the cups 10, and accordingly, an even number of slots through which the fingers pass. The provision of an even number of slots necessarily involves the use of a central track or strip 3, and this is important since it provides a track for contacting the egg at its greatest diameter. In other words, I have found that with the apparatus as described and shown in the drawing, eggs supported in the cups or cradles 10 roll smoothly up over the center strip 3, whereas, if an odd number of fingers and slots are used so that the egg is supported between two spaced-apart central strips, it does not roll smoothly but tends to turn to one side or the other. I therefore regard the use of an even number of slots and a centrally positioned track as important features of my invention.

I claim:

1. In an egg feeding machine, a receptacle dimensioned to contain a quantity of eggs at least several layers deep, said receptacle having walls, a cup cooperating with one of said walls to support one and only one egg thereagainst, and means for periodically moving said cup up through said several layers of eggs adjacent said wall whereby on each upward movement of said cup an egg is picked up by the cup and rolled along said wall.

2. In an egg feeding machine, a receptacle dimensioned to contain a quantity of eggs at least several layers deep, said receptacle having a wall curved upwardly then outwardly then downwardly away from said receptacle, cup means shaped and dimensioned to support one and only one egg against said wall, and means to periodically slowly move said cup upwardly along said wall whereby it picks up an egg and rolls it along the upwardly and outwardly projecting portion of said wall to and beyond the highest point thereof.

3. In an egg feeding machine, a receptacle dimensioned to contain a quantity of eggs at least several layers deep, said receptacle having a wall containing a plurality of upwardly extending slots, a plurality of fingers adapted to extend through said slots and form with the inner surface of said wall a cradle to support an egg, and means for periodically slowly moving said fingers upward through said several layers of eggs in close proximity to said wall, said fingers being inclined at an angle to said wall whereby an egg resting thereon rests against and rolls along said wall as the fingers move upwardly therealong.

4. In an egg feeding machine, a receptacle dimensioned to contain a quantity of eggs at least several layers deep, said receptacle having a wall containing an even number of upwardly extending, spaced-apart slots, a plurality of fingers adapted to extend through said slots, said fingers forming with said wall a cradle to support an egg, said fingers being symmetrically positioned to center said egg with respect to said slots whereby that portion of said wall between the two central slots forms a central track contacting with the largest circle of an egg moved thereover by said fingers.

MORTEN HANSEN.